United States Patent Office 3,376,356
Patented Apr. 2, 1968

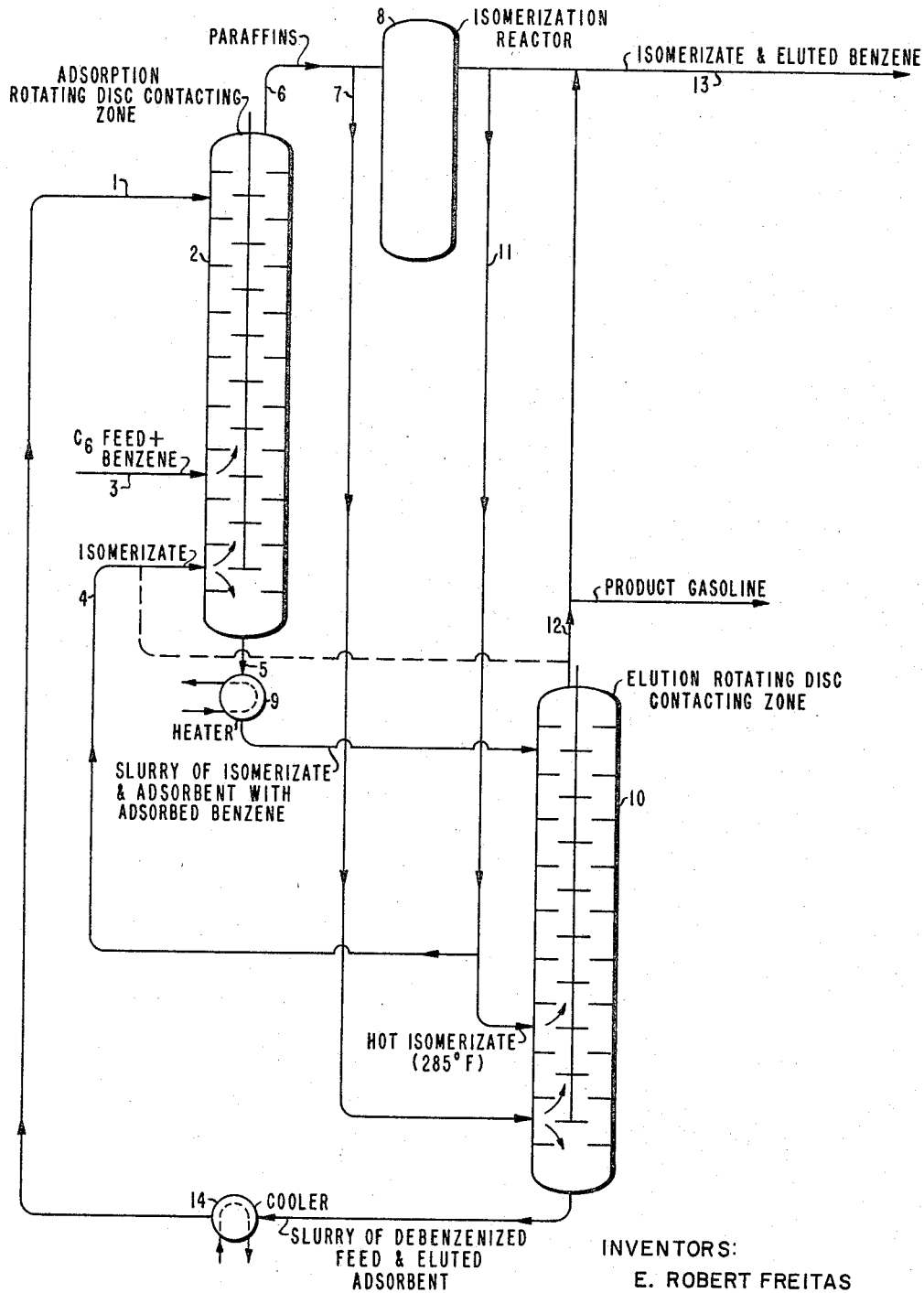

3,376,356
SORPTION PROCESS
Ernest R. Freitas, San Leandro, Carl H. Deal, Jr., Orinda, and Richard K. Griep, Berkeley, Calif., assignor to Shell Oil Company, New York, N.Y., a corporation of Delaware
Filed June 18, 1962, Ser. No. 203,051
8 Claims. (Cl. 260—674)

This invention relates to an improved sorption process for the separation of substances of different sorbabilities by selective sorption. More particularly, this invention relates to an adsorption process wherein the selective adsorbent undergoes an exchange wash treatment whereby the non-selectively absorbed compounds are displaced from the adsorbent.

It is well recognized that certain particulate solids when brought into contact with certain liquids or solutions will attract to themselves components of these liquids by a phenomenon known generally as "sorption." It is also well known that such granular solids (usually termed "sorbents") are selective in their affinity for certain components of liquid mixtures and that this preference is determined at least in part by the quantity of the various components in the mixture available for sorption. In other words, the "selectivity" of the sorbent for component A, in a liquid mixture of components A and B, can be measured by the following:

$$\text{Selectivity for A} = \frac{\frac{\text{concentration of A (sorbed)}}{\text{concentration of A (in liquid)}}}{\frac{\text{concentration of B (sorbed)}}{\text{concentration of B (in liquid)}}}$$

Thus, the total of either component to be sorbed is roughly dependent on the total concentration of each in the solution. It is also known that in conventional sorption processes the following three elements are present:

(1) Contact between the solid sorbent and the liquid mixture whereby some of the mixture is preferentially sorbed on the sorbent, (2) Separation of the unsorbed portion of the liquid mixture, (3) Recovery of the preferentially sorbed material from the solid sorbent, thereby regenerating the sorbent for further use.

One common way of accomplishing Step 3 is by contacting the sorbent with another liquid which may be a solvent for the sorbed component. This liquid may have a greater or lesser affinity for the solid sorbent than the sorbed component. If the affinity of the liquid for the sorbent is less than that of the sorbed component, then the displacing of the latter is accomplished through a mass action or concentration effect. Such substances are described as "desorbents" or "eluants."

An inherent problem limiting the use of most sorption processes, however, is the fact that when a contaminant material, X, is removed from a feed stream containing X and product material, S, large amounts of S are also retained and/or sorbed by the selective sorbent. This is particularly true when the initial concentration of X in the feed stream is low compared to the amount of S contained in the feed stream. This means the during regeneration of the selective absorbent (i.e., the recovery of the selectively sorbed impurity, X, from the solid) significant quantities of the non-selectively sorbed material (product S) is withdrawn from the adsorbent in admixture with X. This results in a loss of product, S, necessitating further separation steps or techniques or, if the latter is not feasible, a less efficient and economical separation process employing the particular feed.

By the instant invention, an improved sorption process is obtained by employing an exchange wash of the sorbent following the sorption sequence. By this technique the non-selectively sorbed components sorbed from the initial feed mixture are exchanged with an extraneous substance without substantially affecting the amount of the selectively sorbed material retained on the sorbent, said exchange being made before the desorption of the selectively sorbed substance occurs.

In other words, when a mixture of X and S are to be separated, the amounts of S retained by the selective sorbent may be reduced or substantially eliminated without materially affecting the equilibrium existing between X and the sorbent by exchanging and displacing the retained S with a third material Y (the exchange wash material). Y in the broadest aspect may include any liquid material other than the feed stream.

The concept of exchange chromatography has been used for displacing the selectively (more strongly) adsorbed components in certain adsorptions. In addition, purging has been used for displacing inter particle liquid. However, the concept and technique of exchange washing the non selectively (less strongly) adsorbed components from the adsorbent pore volume without removing the selectively adsorbed components while simultaneously removing the inter particle liquid is novel. Moreover, that this exchange can be accomplished without significantly affecting the selectively (more strongly) adsorbed component is unobvious and unexpected.

We have found that the exchange washing operation of the present invention is successful, if the exchange wash material is so selected that its strength of adsorption is approximately the same as that of the liquid to be exchanged or removed from the pore. Partition coefficients, $k$'s, or relative adsorbabilities, alphas, may be used in this connection. The laws of mass action coupled with equilibria are used to establish the volume of material as well as stage requirements; the volume and stage requirements being somewhat interdependent.

The exchange wash process of the invention is particularly useful in preparing a feed stream for a conversion reaction process by means of adsorption. By employing as the exchange wash a liquid essentially free from the adsorbed impurities (or with a liquid having concentrations of the adsorbed impurities not substantially exceeding that of a liquid which would be in equilibrium with the adsorbed impurities) wherein the non-selectively adsorbed feed components are exchanged for the finished product material from the reactor or some other liquid stream, by-passing of the non-selectively adsorbed material around the reactor is avoided.

A particularly desirable application of the instant process is in the removal of aromatics such as benzene from a feed to an isomerization reactor although many other applications can be made. It is well known that benzene has a deleterious effect upon the activity of Friedel-Crafts type catalysts which are used in low-temperature isomerization of hexane. In order to prevent sludge formation, the tolerance of benzene in a reactor of this type is in the order of about 0.1% by weight benzene. Although the separation of aromatics can be accomplished by such methods as solvent extraction, extractive distillation, and low-pressure hydrogenation using a catalyst such as palladium, such operations are costly. Moreover, benzene cannot be removed from the isomerization feed by fractionation to the level required without losing most of the normal hexane and part of the methyl-pentanes, which are desirable isomerization feed components because of their low octane ratings, since the effective boiling point of benzene will be about the same as that for normal hexane. Therefore, the need for better methods for removing aromatics from isomerization feeds has continued.

In a specific embodiment of the present invention, benzene is removed from a mixture of $C_6$ hydrocarbons containing a small, contaminating amount of benzene by contacting the feed with a suitable adsorbent such as silica gel. The benzene concentration in, for example, a typical hexane isomerization feed usually ranges from about 0.5% to about 6% by weight.

In this embodiment of the invention, rotating disc contacting zones as described in U.S. Patent 2,601,674 to Reman, issued June 24, 1952, are employed in combination with a solid adsorbent slurry to selectively adsorb one or more components from a liquid feed charge. For the purposes of this invention, each rotating disc contacting zone is divided into two sections, an upper section referred to hereinafter as the adsorption section and a lower portion which will be referred to hereinafter as an "exchange wash" section. One rotating disc contacting zone is used in an adsorption step, and the second in a desorption or elution step. In this embodiment, these rotating disc contacting zones are used to contact a liquid phase with an adsorbent slurry phase, with both phases flowing through the contacting zones co-currently or countercurrently. Today most applications of the instant invention would probably be in the field of countercurrent contacting. Accordingly, this mode of operation is preferred. Preferably these rotating disc contact zones are cylindrical columns consisting of a number of compartments formed by a series of stator rings, with a rotating disc centered in each compartment and supported by a rotating shaft. The feed inlet is preferably arranged tangentially in the direction of shaft rotation.

In the first rotating disc contacting zone, a slurry of silica gel suspended in an essentially aromatic-free paraffin is introduced near the top of the contacting zone. The gel falls through the upper or adsorption section of the zone and selectively adsorbs the impurity (e.g., benzene) from the upflowing feed which was introduced into a lower portion of the adsorption section. The benzene-free feed passes overhead from the first rotating disc contacting zone, the silica gel having benzene adsorbed thereon will also have about 70–80% of its adsorption surface contaminated with feed paraffins. The slurry is then washed with a small upflowing stream of isomerizate-rich material in the exchange wash section, although other liquids may be used.

The exchange wash material is generally introduced a short distance below the feed inlet. Enough of this isomerizate-rich material is introduced in this manner so that the adsorbed feed paraffins are displaced from the silica gel by the isomerizate and the paraffins are further displaced up the zone by this isomerizate stream. The introduction of the isomerizate-rich material in this exchange wash section therefore minimizes the by-passing of feed paraffins around the reactor. The amount of flow of the exchange wash material is so adjusted that there is a net flow upward, with an appreciable amount of the flow being downward and out of the column. The downflowing exchange wash liquid, i.e., isomerizate, introduced into the exchange wash section of the first rotating disc contacting zone may provide the slurry liquid for carrying the gel to the second rotating disc contacting zone. That is, the isomerizate not only may serve to displace the sorbed paraffins of the feed from the gel, but also to displace the paraffinic material from the feed which was serving as the interstitial material between the gel particles and as the carrier for the gel slurry. While the exchange wash, as just described, may serve as the carrying liquid, it is also within the scope of this invention to use a liquid or gas other than the exchange wash liquid as the carrying medium.

The gel slurry leaving the first rotating disc contacting zone is heated and enters the upper section or desorption section of the second rotating disc contacting zone where an upflow of hot benzene-free isomerizate strips the benzene from the gel at about 275° F. The isomerizate and benzene then are passed out of the desorption section of the second rotating disc contacting zone and can then be used in gasoline blending. In the lower or exchange wash section of the second rotating disc contacting zone, the adsorbed isomerizate is displaced from the benzene-stripped silica gel and displaced up the column by a small stream of benzene-free feed paraffin (obtained from the top of the first RDC) introduced near the bottom of the exchange wash section. This stream of benzene-free material also supplies the interstitial liquid for the gel and the necessary slurry liquid to recycle the regenerated gel back to the first rotating disc contacting zone. The benzene-free wash also serves to displace the adsorbed isomerizate up and out of the second zone. The recycle of isomerizate to the reactor is minimized by the exchange wash step. This lower exchange wash section of the second rotating disc contacting zone is analogous to the lower exchange wash section of the first rotating disc contacting zone.

Thus, in the removal of benzene by means of a silica gel slurry and rotating disc contacting zones as described above, an isomerizate stream containing about the same amount of benzene as the feed (i.e., 0.5 to 6% by weight benzene) withdrawn from the second rotating disc contacting zone is used as the exchange wash stream in the adsorption zone. Since the isomerizate exchange wash stream contains a sufficient amount of benzene, no substantial desorption of benzene from the gel is effected in the exchange wash section of the adsorption rotating disc contacting zone. Further, a similar exchange wash section is employed at the bottom of the elution zone in order to minimize the recycling of isomerizates to the adsorption section of the first rotating disc contacting zone. It has been determined that when three equilibrium saturate exchange stages are used in each exchange wash section (adsorption and elution), paraffin feed by-passing can be reduced to about 2% of the total feed charge, while about 15% of the isomerizate is recycled to the isomerization unit.

While the above discussion has been directed to the application of the invention to a continuous countercurrent process wherein the adsorbent is in the form of a moving slurry (set forth in more detail in copending Ser. No. 180,451, filed Mar. 19, 1962, now abandoned), many other types of sorption schemes may utilize the inventive exchange wash process.

Fixed bed adsorption of benzene from hexane (or $C_5$ and $C_6$ containing isomerization feed) and subsequent elution by a hot eluting agent is another technique for preparing feed to a Friedel-Crafts isomerization reaction in which the instant exchange wash invention may be utilized. Such a cyclic fixed-bed system as described in copending Ser. No. 180,459, filed Mar. 19, 1962, now Patent No. 3,265,755, requires a series of contacting zones to accomplish the cyclic operation of adsorption heating, elution and cooling and is another example of a process in which one may employ the exchange wash expedient. Another suitable example is when the sorbent is used in the form of a dense moving bed. Nor should the instant process be necessarily limited to an adsorption process since many other sorption techniques using the instant invention, such as ion exchange, molecular sieve, etc. separation techniques will be obvious to those of ordinary skill in the art.

An absorbent which will preferentially adsorb one type of component in the particular feed charge mixture to be separated may be used in conducting the instant process. Preferably an adsorbent which has a high adsorption capacity and a high degree of selectivity between the components of the feed mixture is employed. Among the commercially available adsorbents, silica gel and activated carbon have adsorptive properties which are especially suitable for separating many types of organic mixtures to which the present process is applicable.

Silica gel is especially effective for selectively adsorbing a more highly polar compound from a less highly polar compound or for separating hydrocarbons having different degrees of saturation. Activated carbon is also effective for separating hydrocarbons according to chemical type and in some instances will to an extent separate hydrocarbons of the same type according to molecular weight. In many cases, activated carbon is capble of selectively adsorbing non-polar compounds, for example, hydrocarbons from polar compounds, for example, alcohols, ketones, etc.

It is to be understood, however, that the process according to the invention may be practiced with other types of adsorbents; and, in fact, with any adsorbent which exhibits a substantial selectivity between the components of the particular charge mixture to be treated. Examples of other suitable sorbents which can be used are Fuller's earth, bauxite, acid-treated clays, bone char, bone black, base-exchange silicate, activated alumina, silica-alumina molecular sieves including both synthetic and natural zeolite and the like.

It will be seen that the principles of the present invention are applicable in the separation of a great variety of organic mixtures, including not only hydrocarbons but also non-hydrocarbons. In fact, adsorption processes are capable of resolving any liquid organic mixture into its component parts when the components have substantially different adsorbabilities on the particular adsorbent selected for use. It is to be understood that the invention is not limited to the sorption treatment of binary mixtures, but also embraces situation wherein multicomponent mixtures containing one or more compounds having adsorbabilities intermeidate to those of the most adsorbable and least adsorbable components are treated. In such cases, the intermediate compound or compounds will tend to concentrate in one or the other products of the process, depending upon whether the adsorptive properties of the intermediates more nearly approach those of the most adsorbable component of the least adsorbable component. Products so obtained may be retreated according to the invention to effect further separation.

Among the various petroleum stocks which can be treated according to the instant invention are (a) kerosene distillates which may be dearomatized and desulfurized to produce a superior-grade stock, (b) gasoline may also be desulfurized and partially deparaffinized to produce a higher octane fuel, (c) diesel fuel may be dearomatized to produce a high cetane number product, (d) lube oils may be dearomatized and deasphaltized to give high quality oil, and (e) narrow boiling aromatic, paraffinic, or olefinic-paraffinic cuts may be fractionated by adsorption to produce pure aromatic, paraffinic, and olefinic compounds. It will be noted that the instant sorption process is adapted to any desired degree of separation. Thus, it may be used to produce a relatively pure compound or it may be used to merely further concentrate the desired compound in its original mixture. Many other sorption fractionations will be obvious to those skilled in the art.

The separation or fractionation of normally solid or gaseous organic compounds are also within the scope of the instant invention. For example, the instant process is readily adaptable to the fractionation of a normally gaseous butene-butadiene liquid mixture by slightly increasing operation pressures. Similarly it is within the scope of this process to purify normally solid naphthalene stock by conducting the liquid adsorption step at a moderately elevated temperature.

The temperature of the sorption zone may range within wide limits provided that it is below the boiling temperature of the feed mixtures under the pressure and temperature conditions maintained in the zone. Suitable temperatures for the sorption zone range from the melting point of the feed mixture up to about the boiling point of the mixture at pressures from 0.1 p.s.i. absolute to about 500 p.s.i. absolute, assuming the feed mixture is stable under these conditions. In a preferred embodiment of the invention, substantially atmospheric pressure is maintained in the sorption zone. In a further preferred embodiment of the invention, the sorption zone is operated at atmospheric temperature. The elution zone is operated at appropriate temperatures and pressure with the volumes of desorbent and absorbent liquids being about equal.

The particle size and physical shape of the sorbents used, assuming a porous structure, is dependent mainly upon the type of equipment in which it is to be used. Where rotating dis contactors are used in the absorption and elution steps. A mesh size of between about 20 and 150 has been found convenient. In one preferred embodiment of the invention, mesh sizes between about 40 and about 60 are employed. Whereas, when a fixed bed system is used, mesh sizes of between 28 and 200 have been found convenient.

Referring to the specific example previously discussed, the exchange stage requirements for adsorbent and eluting rotating disc contactors for various amounts of exchange wash liquid are shown in Tables I and II, respectively. Since recycle of isomerizate saturates is probably more desirable than by-passing the feed saturates, the liquid flow in the adsorber exchange section will probably be somewhat greater than the total volume of adsorbed saturated coming down the column. In this way, the number of stages required to reduce by-pass to a given amount is lowered at the expense of increasing recycle. In the elution exchange zone in order to minimize by-pass, the flow will probably be somewhat smaller than the total amount of adsorbed saturates coming down the column.

TABLE I.—STAGE REQUIREMENTS IN ADSORBER SATURATE EXCHANGE SECTION

| BW/S[1] | Stages | Feed [2] Saturates Bypassed, Percent | Isomerizate [2] Saturates Recycled, Percent |
|---|---|---|---|
| 1.0 | 1 | 6.1 | 6.1 |
|  | 2.5 | 3.7 | 3.7 |
|  | 4 | 2.4 | 2.4 |
|  | 9 | 1.2 | 1.2 |
| 1.3 | 3 | 2.4 | 6.1 |
|  | 5 | 1.2 | 4.9 |
| 1.5 | 2 | 2.4 | 8.5 |
|  | 3.3 | 1.2 | 7.3 |

[1] Ratio of vol. of saturates backwashed to vol. of saturates in absorbed phase.
[2] Calculated for 3% w. benzene feed. Values will be lower for higher benzene concentration in feed.

TABLE II.—STAGE REQUIREMENTS IN ELUTION SATURATE EXCHANGE SECTION

| BW/S [1] | Stages | Feed Saturates Bypassed, Percent | Isomerizate Saturates Recycled, Percent |
|---|---|---|---|
| 1.0 | 1 | 7.3 | 7.3 |
|  | 2.5 | 4.4 | 4.4 |
|  | 4 | 2.9 | 2.9 |
|  | 9 | 1.5 | 1.5 |
| 0.8 | 1.3 | 4.3 | 7.3 |
|  | 3.9 | 1.5 | 4.4 |
| 0.6 | 2.5 | 1.5 | 7.3 |
|  | 3.1 | 0.7 | 6.6 |

[1] Volume of saturates backwashed/volume of saturates in absorbed phase.

In order to make the equilibrium stage determinations in the exchange sections as set forth in Tables I and II above, the gel selectivity for feed saturates and isomerize saturates as assumed to be unity. Furthermore, since there was no net transfer of benzene in the exchange sections, the system could be treated as binary.

Referring to the drawing which consists of a single figure representing only one embodiment of the invention, a slurry of silica gel adsorbent suspended in a debenzenized paraffin fraction is introduced by line 1 into the top of adsorption rotating disc contacting zone 2. The potential isomerization feed containing benzene is introduced into the lower portion of adsorption section of zone 2 through line 3, and contacts the descending silica gel adsorbent in a countercurrent manner, thus providing the most efficient utilization of the adsorbent. In order to prevent carry-down of the hexane feed into the elution stage, a stream of isomerizate containing benzene is introduced into zone 2 through line 4, a short distance below the isomerization feed inlet.

The flow of the isomerizate is so adjusted that there will be a small flow upward with the bulk of the flow being down and out of zone 2 with the adsorbent slurry through line 5. The debenzenized feed which has been exchange washed by means of the isomerizate/benzene stream is removed from the top of zone 2 through line 6 and introduced into isomerization reactor 8. The slurry of isomerizate and adsorbent with absorbed benzene and isomerizate passes from zone 2 by means of line 5 through heat exchanger 9 wherein the temperature of the slurry is raised to the proper level for introduction into elution rotating disc containing zone 10. The heated slurry is then introduced into the upper section of elution rotating disc contacting zone 10.

Hot isomerizate product taken from isomerizate reactor 8 via line 11 in introduced into the lower section of elution rotating disc contacting zone 10 with the flow of the hot isomerizate so adjusted that the bulk will flow upward and contact in a countercurrent manner the adsorbent containing benzene. The rate of flow and temperature of the isomerizate is controlled so as to effect essentially complete elution of the benzene from the adsorbent; for example a temperature of 275° F. is preferred. The combined eluated benzene and exchange washed isomerizate pass overhead from elution zone 10 through line 12 and can be recombined with the isomerizate from reactor 8 in line 13.

A sufficient quantity of debenzenized hexane is taken from the overhead product of zone 2 and introduced as the exchange wash liquid into elution rotating disc contacting zone 10, at a point below the inlet of a hot isomerizate, to carry the adsorbent slurry from the bottom of zone 10 to the top of adsorption zone 2 through line 1. The net flow of hot isomerizate introduced through line 11 is adjusted so that there is a small downward flow of the hot isomerizate in zone 10, thereby minimizing any contamination of isomerizate product with raw feed. The bottom exchange washed slurry from zone 10 is withdrawn by means of line 1, cooled in cooler 14 to the proper temperature prior to reintroduction into zone 2.

The auxiliary apparatus employed in this process may be any conventional or convenient type known to those skilled in the art. For simplicity, the drawing does not shown all the pumps, tanks, heat exchangers, valves, bypasses, vents, reboilers, condensers, coolers, and other auxiliary equipment that may be necessary for the proper operation of the process but the inclusion of which will be evident to those skilled in the art. Although the above embodiment employs two separate rotating disc contacting zones, it will be readily apparent that more than two contactors can be employed. Similarly, it will be apparent that a single contactor in which both the adsorption and elution takes place concurrently can be employed.

We claim as our invention:

1. In an adsorption process for separating adsorbable components from a first liquid consisting essentially of an organic mixture and comprising the adsorbable components and relatively non-adsorbable components wherein the components to be separated are selectively adsorbed and the adsorbent is regenerated by desorbing the selectively adsorbed components from the adsorbent with a desorbent, the improvement which comprises contacting the adsorbent containing the desorbent with a second liquid having a strength of adsorption approximately the same as that of the relatively non-sorbable components to replace the desorbent whereby a further amount of the desorbent is withdrawn from the desorption zone.

2. In an adsorption process for separating adsorbable components from a first liquid consisting essentially of an organic mixture and comprising the adsorbable components and relatively non-adsorbable components wherein the components to be separated are selectively adsorbed and the adsorbent is regenerated by desorbing the selectively adsorbed components from the adsorbent with a desorbent; the improvement which comprises (1) contacting the adsorbent containing the adsorbed components with a second liquid having a strength of adsorption approximately the same as that of the relatively non-sorbable components in an amount sufficient to replace the non-selectively adsorbed components from the first liquid present in the adsorbent without substantially changing the amount of selectively adsorbed components present on the adsorbent and (2) contacting the adsorbent containing the desorbent with a third liquid to replace the desorbent whereby a further amount of desorbent is withdrawn from the desorption zone.

3. The process of claim 2 wherein the first liquid is a hydrocarbon isomerization feed containing a major amount of benzene, the adsorbent is silica gel, the second liquid is isomerizate containing a minor amount of benzene, and the third liquid is a substantially benzene-free hydrocarbon isomerization feed.

4. The process of claim 3 wherein the silica gel is utilized in a finely divided slurry form.

5. The process of claim 4 wherein the silica gel is utilized in fixed beds.

6. The process of claim 4 wherein the silica gel is utilized in the form of a dense moving bed.

7. The process of claim 4 wherein the adsorption process is continuous and countercurrent.

8. In an adsorption process for removing benzene from a liquid hydrocarbon isomerization feed comprising benzene, naphthenes, and paraffins wherein the benzene is selectively adsorbed on silica gel in an adsorption zone, the isomerization feed is recovered from the adsorption zone free of benzene and the silica gel is regenerated by desorbing the benzene from the adsorbent with isomerizate in a desorption zone; the improvement which comprises (1) contacting, in an amount sufficient to replace the paraffins and naphthenes components of the isomerization feed retained in the adsorbent during adsorption, the silica gel containing the adsorbed benzene with an isomerizate containing benzene, whereby a further amount of the paraffins and the naphthenes of the isomerization feed are withdrawn from the silica gel without substantially changing the amount of benzene present on the silica gel, and (2) contacting during desorption, the silica gel containing the isomerizate desorbent with a benzene-free, paraffin and naphthene containing hydrocarbon isomerization feed stream in an amount sufficient to replace the isomerizate desorbent from the silica gel.

References Cited

UNITED STATES PATENTS

| 2,415,315 | 2/1947 | Walter et al. | 260—683.73 |
| 2,464,311 | 3/1949 | Hiatt et al. | 260—674 |
| 2,585,492 | 2/1952 | Olsen | 260—674 |
| 2,771,465 | 11/1956 | Whitney | 260—674 |
| 2,818,449 | 12/1957 | Christensen et al. | 260—674 |
| 2,937,215 | 5/1960 | Bleich et al. | 260—683.73 |
| 3,054,838 | 9/1962 | Egan | 260—674 |

FOREIGN PATENTS

| 521,963 | 2/1956 | Canada. |

DELBERT E. GANTZ, *Primary Examiner.*

ALPHONSO D. SULLIVAN, *Examiner.*

C. E. SPRESSER, *Assistant Examiner.*